US012706116B2

(12) United States Patent
Johnson

(10) Patent No.: US 12,706,116 B2
(45) Date of Patent: Aug. 11, 2026

(54) INCREASED VCM CURRENT RESOLUTION DURING TRACK FOLLOW TO DECREASE NRRO

(71) Applicant: Western Digital Technologies, Inc., San Jose, CA (US)

(72) Inventor: Brian Johnson, Laguna Hills, CA (US)

(73) Assignee: Western Digital Technologies, Inc.

( * ) Notice: Subject to any disclaimer, the term of this patent is extended or adjusted under 35 U.S.C. 154(b) by 40 days.

(21) Appl. No.: 18/485,622

(22) Filed: Oct. 12, 2023

(65) Prior Publication Data

US 2025/0124950 A1 Apr. 17, 2025

(51) Int. Cl.

| | |
|---|---|
| ***G11B 5/55*** | (2006.01) |
| ***G11B 5/00*** | (2006.01) |
| ***G11B 5/596*** | (2006.01) |
| ***G11B 21/08*** | (2006.01) |

(52) U.S. Cl.

CPC .......... *G11B 5/5586* (2013.01); *G11B 5/5547* (2013.01); *G11B 5/556* (2013.01); *G11B 5/5569* (2013.01); *G11B 5/596* (2013.01); *G11B 21/083* (2013.01); *G11B 2005/0018* (2013.01); *G11B 2220/2516* (2013.01)

(58) Field of Classification Search

None

See application file for complete search history.

(56) References Cited

U.S. PATENT DOCUMENTS 5,297,024 A * 3/1994 Carobolante ........ G11B 21/083 360/78.04
5,585,976 A 12/1996 Pham
6,097,565 A 8/2000 Sri-Jayantha et al.
(Continued)

FOREIGN PATENT DOCUMENTS

EP 0600706 A1 3/1998
EP 0665548 B1 8/2001
(Continued)

OTHER PUBLICATIONS

Ling et al., A 14-Bit Linear DAC for VCM Driver, 1998, Retrieved from https://www.ti.com/sc/docs/msp/papers/1998/ling.pdf.

*Primary Examiner* — Craig A. Renner
(74) *Attorney, Agent, or Firm* — NOD Law PC

(57) ABSTRACT

A data storage device may include one or more disks; a voice coil motor (VCM) driver for driving a VCM and having a programmable transconductance ($G_m$); an actuator arm assembly comprising one or more disk heads and the VCM, wherein the VCM is configured to operate in a first mode and a second mode; and one or more processing devices configured to control the actuator arm assembly to actuate the disk heads over corresponding disk surfaces of the disks, and further configured to: determine a current mode of operation of the VCM, the current mode of operation comprising the first mode; and transition the VCM from the current mode of operation to a new mode of operation, the new mode of operation comprising the second mode, wherein the transitioning comprises tuning the $G_m$ from a first transconductance value to a second, different transconductance value.

14 Claims, 8 Drawing Sheets

(56) References Cited

U.S. PATENT DOCUMENTS

| | | | | |
|---|---|---|---|---|
| 6,229,273 | B1 * | 5/2001 | Kelly et al. | G11B 21/083 360/78.04 |
| 7,595,953 | B1 * | 9/2009 | Cerda et al. | G11B 5/596 360/77.04 |
| 11,763,843 | B1 | 9/2023 | Byoun et al. | |
| 2005/0180042 | A1 | 8/2005 | Baek et al. | |
| 2006/0114602 | A1 | 6/2006 | Baek et al. | |
| 2024/0265940 | A1 * | 8/2024 | Boscolo Berto et al. | G11B 5/5569 |

FOREIGN PATENT DOCUMENTS

| | | | |
|---|---|---|---|
| EP | 1351045 | A2 | 10/2003 |
| KR | 20070075528 | A | 7/2007 |

* cited by examiner

PRIOR ART

INCREASED VCM CURRENT RESOLUTION DURING TRACK FOLLOW TO DECREASE NRRO

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1 shows a prior art disk format 2 as comprising a number of radially-spaced, concentric servo tracks 4 defined by servo wedges $\mathbf{6}_0$-$\mathbf{6}_N$ recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge $\mathbf{6}_i$ (where 'i' ranges from 1 to N) comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $\mathbf{6}_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during read/write operations. A position error signal (PES) is generated by reading the servo bursts 14, where the PES represents a measured position of the head relative to a centerline of a target servo track. A servo controller processes the PES to generate a control signal applied to the one or more actuators in order to actuate the head radially over the disk in a direction that reduces the PES.

The description provided in the background section should not be assumed to be prior art merely because it is mentioned in or associated with the background section. The background section may include information that describes one or more aspects of the subject technology.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Magnetic recording hard disk drives use an actuator, typically a rotary voice-coil-motor (VCM) actuator, for positioning the read/write heads on the data tracks of the recording disks. The disk drive has a servo control system that receives a position error signal (PES) from servo positioning information read by the heads from the data tracks and generates a VCM control signal to maintain the heads on track and move them to the desired track for reading and writing of data. In some instances, a digital signal processor (DSP) of the disk drive calculates a VCM current that is required by the VCM to compensate for its PES. Additionally, the VCM (or VCM driver) can also include a transconductance ($G_m$) loop which sets the VCM current to a value proportional to the digital to analog converter (DAC) code. This may be done by measuring the VCM current, where the VCM current may be measured directly or indirectly (e.g., measuring a voltage drop across a sense resistor). In some cases, the voltage across the VCM may be controlled to achieve the desired VCM current.

In some cases, a VCM control loop may include a plurality of modes/functions. For example, while in seek mode, the VCM may move from one concentric data track to another, where the tracks may be adjacent, or separated from each other by one or more other concentric data tracks. Furthermore, while in track follow mode, the VCM may read magnetic markings (e.g., servo marks) on the disk surface, based on which the PES is developed. In some instances, while in the track follow mode, only a fraction of the DAC range that can be supported by the VCM DAC is utilized, which allows a higher DAC range to be made available for the track seek mode. In some circumstances, increasing the value of the VCM sense resistor ($R_s$), which is equivalent to lowering the VCM transconductance $G_m$, can help improve certain performance metrics for the data storage device, including at least repeatable runout (RRO) and/or non-repeatable runout (nRRO). In this way, increasing the VCM sense resistor can help decrease the noise in the VCM control loop, improve PES, and/or increase VCM resolution. However, simply increasing the value of the VCM sense resistor ($R_s$) may not be an adequate solution for optimizing disk drive performance due to the increase in power consumption, resistive losses, etc.

Since the nRRO for a data storage device is linked or associated with the VCM DAC resolution (e.g., measured as current/least significant bit or mA/LSB), it is contemplated that enhancing VCM current resolution (e.g., during the track follow mode) can help improve nRRO. Broadly, aspects of the present disclosure are directed to techniques for enhancing VCM current resolution during track follow, which can help optimize nRRO as compared to the prior art. In some embodiments, aspects of the present disclosure can be implemented using a programmable or variable transconductance ($G_m$) for the VCM control loop, which allows different transconductance values to be utilized based on the mode of operation. In one non-limiting example, a higher $G_m$ or transconductance value can be utilized during the seeking mode, and a lower $G_m$ or transconductance value can be utilized during the track follow mode. Such a design allows a higher maximum current to be utilized when the VCM is in the track seek mode, and a higher/more optimal current resolution to be utilized when the VCM is in the follow mode, further described below in relation to FIGS.

2A-5. In some instances, a higher maximum current may help reduce seek times and/or allow for faster read/write speeds of the HDD. Additionally, or alternatively, aspects of the present disclosure can be implemented using a non-linear VCM DAC, which can help provide increased VCM current resolution in the track follow region and/or track seek region, as compared to the prior art.

In some aspects, the techniques described herein relate to a data storage device, including: one or more disks; a voice coil motor (VCM) driver having a programmable transconductance ($G_m$) and configured to drive a VCM; an actuator arm assembly including one or more disk heads and the VCM, wherein the VCM is configured to operate in a first mode and a second mode; and one or more processing devices configured to control the actuator arm assembly to actuate the one or more disk heads over corresponding disk surfaces of the one or more disks, the one or more processing devices being further configured to: determine a current mode of operation of the VCM, the current mode of operation including the first mode; and transition the VCM from the current mode of operation to a new mode of operation, the new mode of operation including the second mode, wherein the transitioning includes tuning the $G_m$ from a first transconductance value to a second transconductance value different from the first transconductance value.

In some aspects, the techniques described herein relate to a data storage device, wherein: the first mode includes a track follow mode, the second mode includes a track seek mode, and the second transconductance value associated with the track seek mode is higher than the first transconductance value associated with the track follow mode.

In some aspects, the techniques described herein relate to a data storage device, wherein the one or more processing devices are further configured to perform the tuning of the $G_m$ by: controlling the VCM to follow a first target track in the first mode, based at least in part on using the first transconductance value for the VCM driver; identify a second target track; and seek the VCM towards the second track in the second mode, based at least in part on using the second transconductance value for the VCM driver.

In some aspects, the techniques described herein relate to a data storage device, wherein the one or more processing devices are further configured to: tune the programmable transconductance $G_m$ from the second transconductance value to a third transconductance value, based at least in part on detecting a position error signal (PES) is below a threshold; and control the VCM to follow the second target track in a third mode, based at least in part on using the third transconductance value for the VCM driver.

In some aspects, the techniques described herein relate to a data storage device, wherein the third mode includes the track follow mode.

In some aspects, the techniques described herein relate to a data storage device, wherein one of: the third transconductance value is equal or substantially equal to the first transconductance value; or the third transconductance value is different from the first and second transconductance values.

In some aspects, the techniques described herein relate to a data storage device, wherein the VCM driver includes a plurality of tunable resistances, including at least a first tunable resistance ($R_1$) and a second tunable resistance ($R_2$), and wherein tuning the $G_m$ includes adjusting a respective resistance value of at least one of the first and the second tunable resistances, $R_1$ and $R_2$.

In some aspects, the techniques described herein relate to a data storage device, wherein the first mode includes a track follow mode and the second mode includes a track seek mode, and one or more of: a ratio of a respective resistance value of the first tunable resistance to the second tunable resistance is higher in the track seek mode as compared to the track follow mode, a maximum VCM current is higher in the track seek mode as compared to the track follow mode, and a current resolution is higher in the track follow mode as compared to the track seek mode.

In some aspects, the techniques described herein relate to a data storage device, wherein the first tunable resistance is associated with an output of a digital-to-analog converter (DAC) coupled to the VCM driver, and wherein the second tunable resistance is associated with an output of a current sense amplifier (CSA) of the VCM driver.

In some aspects, the techniques described herein relate to a data storage device, wherein the VCM driver comprises a plurality of tunable resistances, including at least a first tunable resistance and a second tunable resistance; and a CSA associated with a gain $G_s$; and wherein tuning the $G_m$ comprises adjusting at least one of (1) a respective resistance value of one or more of the first and the second tunable resistances, and (2) the gain $G_s$ of the CSA.

In some aspects, the techniques described herein relate to a data storage device, wherein the VCM driver is configured to drive the VCM using a linear or current control loop (CCL) signal when operating in the first mode or track follow mode, and using a pulse width modulation (PWM) signal when operating in the second mode or track seek mode.

In some aspects, the techniques described herein relate to a data storage device, wherein the transitioning further comprises: identifying a first switch over point and a second switch over point, the first switch over point corresponding to a first number of tracks remaining before arrival at the target track and the second switch over point corresponding to a second number of tracks remaining before arrival at the target track, the second number lower than the first number; tuning, at the first switch over point, the $G_m$ from the second transconductance value to the first transconductance value, wherein the second transconductance value is higher than the first transconductance value; and at the second switch over point, causing the VCM to seek towards the target track by driving the VCM using a linear or current control loop (CCL) signal, and wherein the second switch over point occurs before the VCM transitions into the first mode, the first mode comprising a track follow mode.

In some aspects, the techniques described herein relate to a data storage device, including: one or more disks; an actuator arm assembly including: one or more disk heads, and a voice coil motor (VCM), wherein the VCM is configured to operate in a first mode and a second mode; and one or more processing devices configured to: identify a first set of DAC code values associated with the first mode, wherein the first set of DAC code values correspond to a first range of VCM current; identify a second set of DAC code values associated with the second mode, wherein the second set of DAC code values correspond to a second range of VCM current; and select a DAC code value from one of the first set and the second set of DAC code values to adjust a current flowing through the VCM, wherein the selecting is based at least in part on a mode of operation of the VCM and a position error signal (PES) of the VCM, and wherein the first and the second set of DAC code values are associated with a non-linear function.

In some aspects, the techniques described herein relate to a data storage device, wherein the one or more processing devices further comprises a sense resistor associated with the VCM, and wherein the selected DAC code value is based at least in part on one or more of monitoring a current flowing through the VCM and measuring a voltage drop across the sense resistor.

In some aspects, the techniques described herein relate to a data storage device, wherein the one or more processing devices are further configured to: store a lookup table including the first set of DAC code values and the second set of DAC code values and a respective VCM current value for each DAC code value from the first and the second set of DAC code values.

In some aspects, the techniques described herein relate to a data storage device, wherein the first mode includes a track follow mode, and the second mode includes a track seek mode.

In some aspects, the techniques described herein relate to a data storage device, wherein the first mode includes a linear or current control loop (CCL) mode, and the second mode includes a pulse width modulation (PWM) mode.

In some aspects, the techniques described herein relate to a data storage device, wherein the non-linear function includes one of a polynomial function or a logarithmic function.

In some aspects, the techniques described herein relate to a method of operating a data storage device, including: determining a current mode of operation of a voice coil motor (VCM) of the data storage device, wherein the VCM is configured to operate in a first mode and a second mode, the current mode of operation comprising the first mode, and wherein the VCM is configured to be driven using a VCM driver having a programmable transconductance ($G_m$); transitioning the VCM from the current mode of operation to a new mode of operation, the new mode of operation including the second mode, wherein the transitioning includes tuning the programmable transconductance from a first transconductance value to a second transconductance value different from the first transconductance value.

In some aspects, the techniques described herein relate to a method, wherein: the first mode includes a track follow mode, and the second mode includes a track seek mode.

In some aspects, the techniques described herein relate to a method, wherein the second transconductance value associated with the track seek mode is higher than the first transconductance value associated with the track follow mode.

In some aspects, the techniques described herein relate to one or more processing devices, including: means for determining a current mode of operation of a voice coil motor (VCM) of a data storage device, wherein the VCM is configured to operate in a first mode and a second mode, the current mode of operation comprising the first mode, and wherein the VCM is configured to be driven using a VCM driver having a programmable transconductance ($G_m$); means for transitioning the VCM from the current mode of operation to a new mode of operation, the new mode of operation including the second mode, wherein the transitioning includes: means for tuning the $G_m$ from a first transconductance value to a second transconductance value.

Various further aspects are depicted in the accompanying figures and described below and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The embodiments described below are not intended to limit the disclosure to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

Magnetic recording hard disk drives use an actuator, typically a rotary voice-coil-motor (VCM) actuator, for positioning the read/write heads on the data tracks of the recording disks. The disk drive has a servo control system that receives a position error signal (PES) from servo positioning information read by the heads from the data tracks and generates a VCM control signal to maintain the heads on track and move them to the desired track for reading and writing of data. For instance, the head is connected to a distal end of an actuator arm which is rotated about a pivot by the VCM in order to actuate the head radially over the disk to access radially spaced, concentric tracks. The disk drive receives power from a host computer (e.g., host 25 in FIG. 2A) for powering a spindle motor, the VCM 20, and the one or more integrated circuits that control the operation of the disk drive.

Figure 2A:
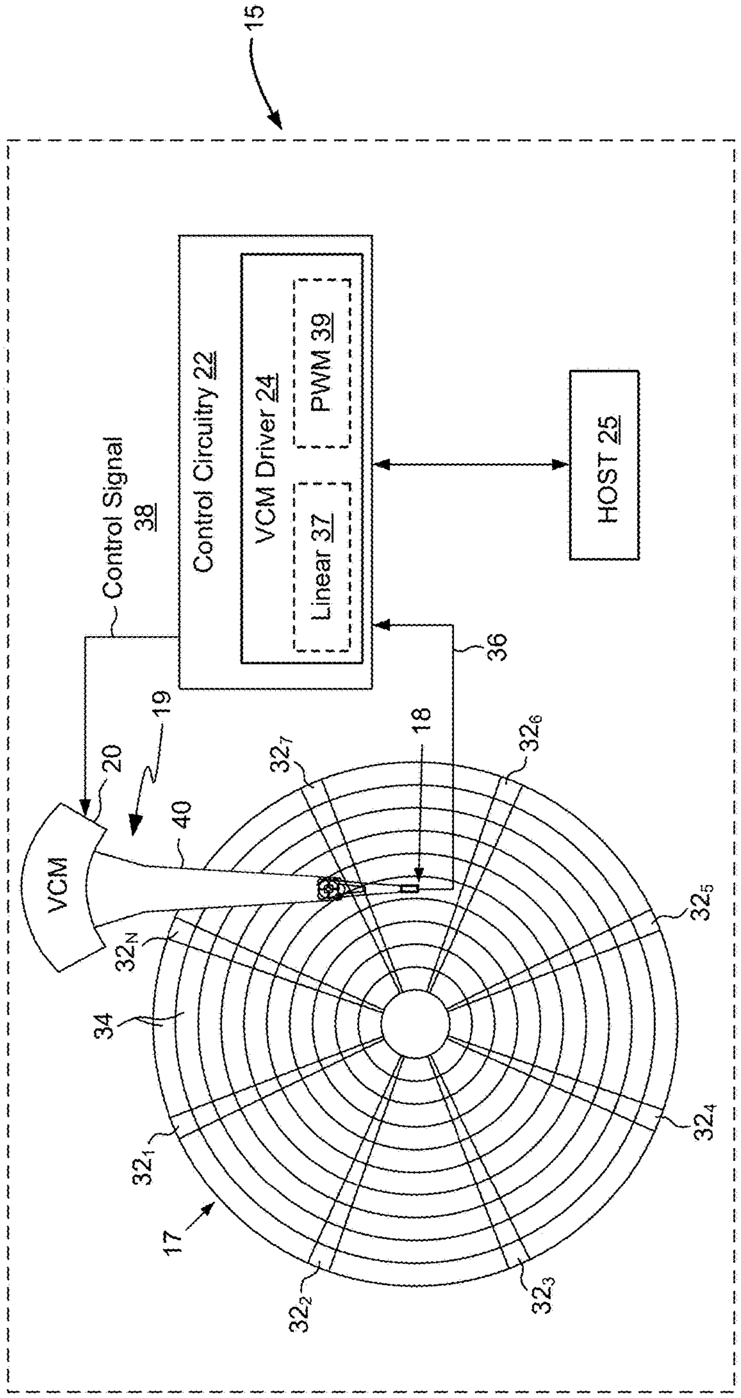
FIG. 2A illustrates a conceptual block diagram of a top view of a data storage device in the form of a disk drive comprising a head actuated over a disk and a control circuitry configured to effectuate one or more aspects of the present disclosure.
Figure 2B:
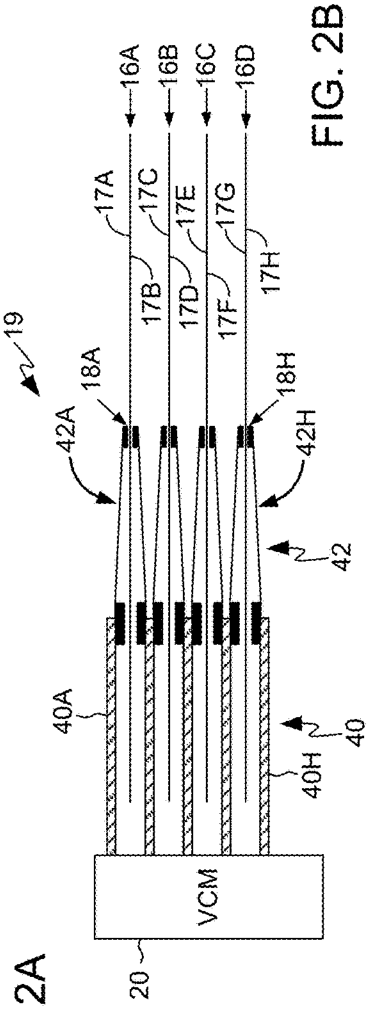
FIG. 2B illustrates a conceptual block diagram of a side view of the data storage device in FIG. 2A, according to various aspects of the present disclosure.

The disk(s), such as disks 16A through 16D in FIG. 2B, are typically rotated by the spindle motor at a high speed so that an air bearing forms between a head, e.g., heads 18A and 18H and a disk surface, such as a disk surface 17A through 17H. For example, each disk may include a first and second surface. The disk 16A may include a first disk surface 17A and a second disk surface 17B; the disk 16B may include a first disk surface 17C and a second disk surface 17D; the disk 16C may include a first disk surface 17E and a second disk surface 17F; and the disk 16D may include a first disk surface 17G and a second disk surface 17H. The VCM is configured to move the head assembly across the rotating disk to access individual packets of data written on the disk's magnetic media. Typically, data is written on the surface of the disk(s) in concentric circles known as tracks. In order to read or write data at the disk surface, the magnetic read/write head(s) are positioned with high accuracy directly over the target track (i.e., track containing data requested by the computer or host's operating system). In some cases, the VCM control loop (e.g., shown in FIG. 4) may include a plurality of modes/functions. For example, while in seek mode, the VCM may move from one concentric data track to another, where the tracks may be adjacent, or separated from each other by one or more other concentric data tracks. Furthermore, while in track follow mode, the movement of VCM may be relatively small to allow for the heads in the head assembly to stay on the same track and read magnetic markings (e.g., servo marks) on the disk surface. In some instances, these servo marks may be physically located on and near the data tracks, which enables a position error signal (PES) to be developed. In some examples, the control circuitry of the data storage device may be configured to monitor feedback on the VCM position relative to the disk surface during track seek mode and/or track follow mode. Additionally, during a track follow mode, the VCM may be configured to servo the magnetic read/write head directly over the data as the disk spins underneath it.

In some instances, the primary control loop of the VCM processes signals from the servo marks from the disk surface, demodulates them, and provides a position error signal (PES) to a digital signal processor (DSP) integrated circuit (IC). Specifically, the read channel of the disk drive receives (or reads) the signal from the head and feeds it back to the servo control loop of the VCM. The DSP then calculates the current (herein referred to as VCM current) required by the VCM to compensate for its PES and communicates this information to the control circuitry 22 (or servo IC). In some cases, the VCM control loop includes a VCM driver comprising a transconductance ($G_m$) loop which sets the VCM current to a value proportional to the digital to analog converter (DAC) code. This may be done by measuring the VCM current, where the VCM current may be measured directly or indirectly (e.g., measuring a voltage drop across a sense resistor, such as $R_s$ 333 in FIG. 3). In some cases, the voltage across the VCM may be controlled to achieve the desired VCM current.

In some instances, while in the track follow mode, only a fraction of the DAC range that can be supported by the VCM DAC is utilized, which allows a higher DAC range to be made available for the track seek mode. In some cases, increasing the value of the VCM sense resistor ($R_s$), which is equivalent to lowering the VCM transconductance $G_m$, can help improve one or more performance metrics (e.g., handling of track eccentricities affecting head placement accuracy, such as repeatable runout (RRO) and/or non-repeatable runout (nRRO)) for the data storage device. In this way, increasing the value of the VCM sense resistor ($R_s$) may help in one or more of decreasing the noise in the VCM loop, improving PES, and/or increasing VCM resolution. Additionally, or alternatively, the resolution associated with the VCM DAC, e.g., measured as current/least significant bit or mA/LSB, can directly contribute to the handling of nRRO in a data storage device. In some instances, higher VCM DAC resolution may offer finer control precision, which can help improve the one or more performance metrics for the data storage device. However, simply increasing the value of the VCM sense resistor ($R_s$) may not be an adequate solution for optimizing disk drive performance due to the increase in power consumption, resistive losses, etc.

Broadly, aspects of the present disclosure are directed to techniques for enhancing VCM current resolution during track follow, which can help decrease the effect of nRRO (and increase track follow accuracy) as compared to the prior art. In some embodiments, aspects of the present disclosure can be implemented using a programmable or variable transconductance ($G_m$) for the VCM control loop, which allows different transconductance values to be utilized based on the mode of operation. In one non-limiting example, a higher $G_m$ or transconductance value can be utilized during the seeking mode, and a lower $G_m$ or transconductance value can be utilized during the track follow mode. Such a design allows a higher maximum current to be utilized when the VCM is in the track seek mode, and a higher/more optimal current resolution to be utilized when the VCM is in the track follow mode. Additionally, or alternatively, aspects of the present disclosure can also be implemented using a non-linear VCM DAC, which can help provide increased VCM current resolution in the track follow region and/or track seek region, as compared to the prior art.

Figure 3:
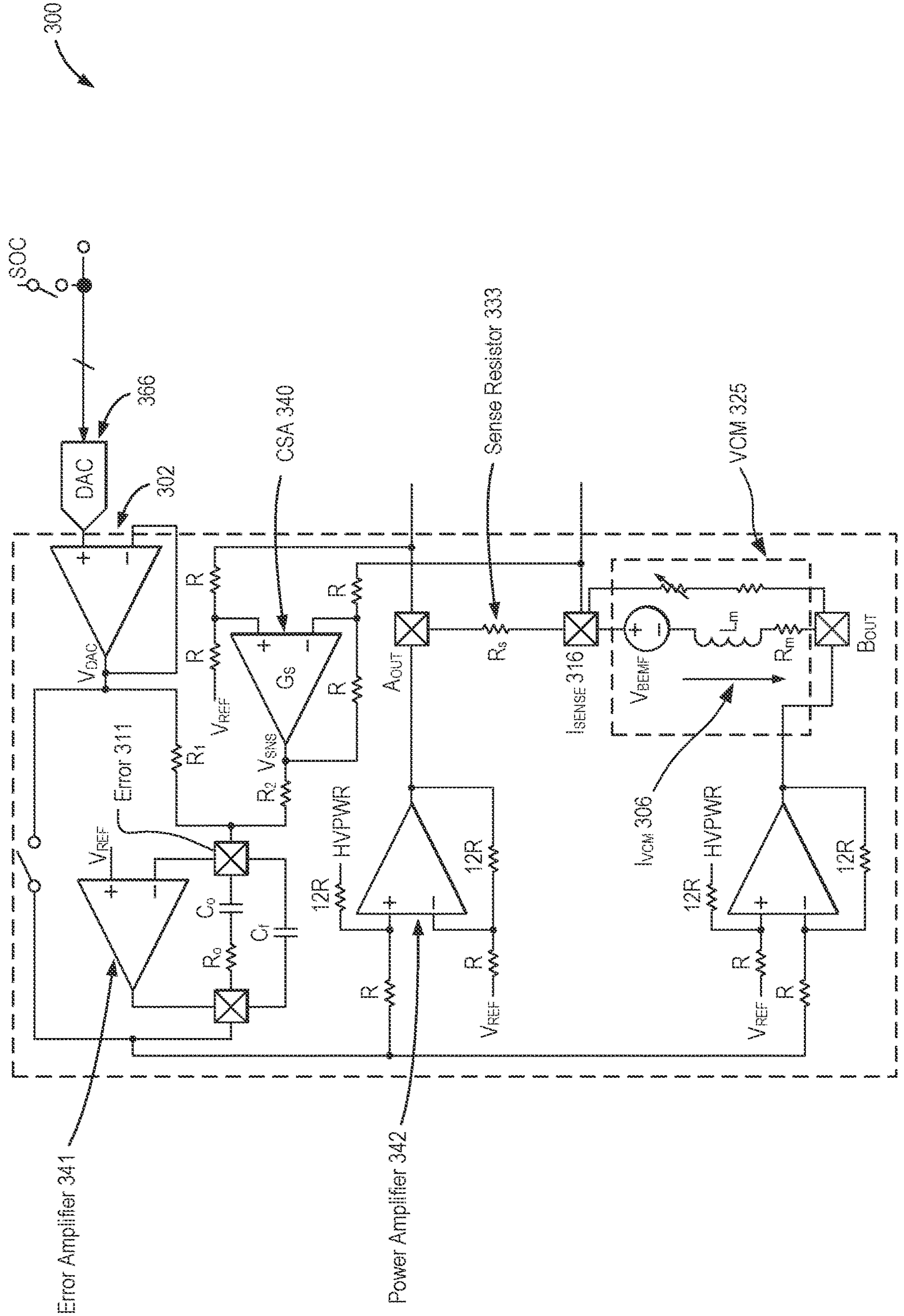
FIG. 3 shows a block diagram of a voice control motor (VCM) configured for decreasing non-repeatable runout (nRRO) in a data storage device, according to various aspects of the present disclosure.
Figure 4:
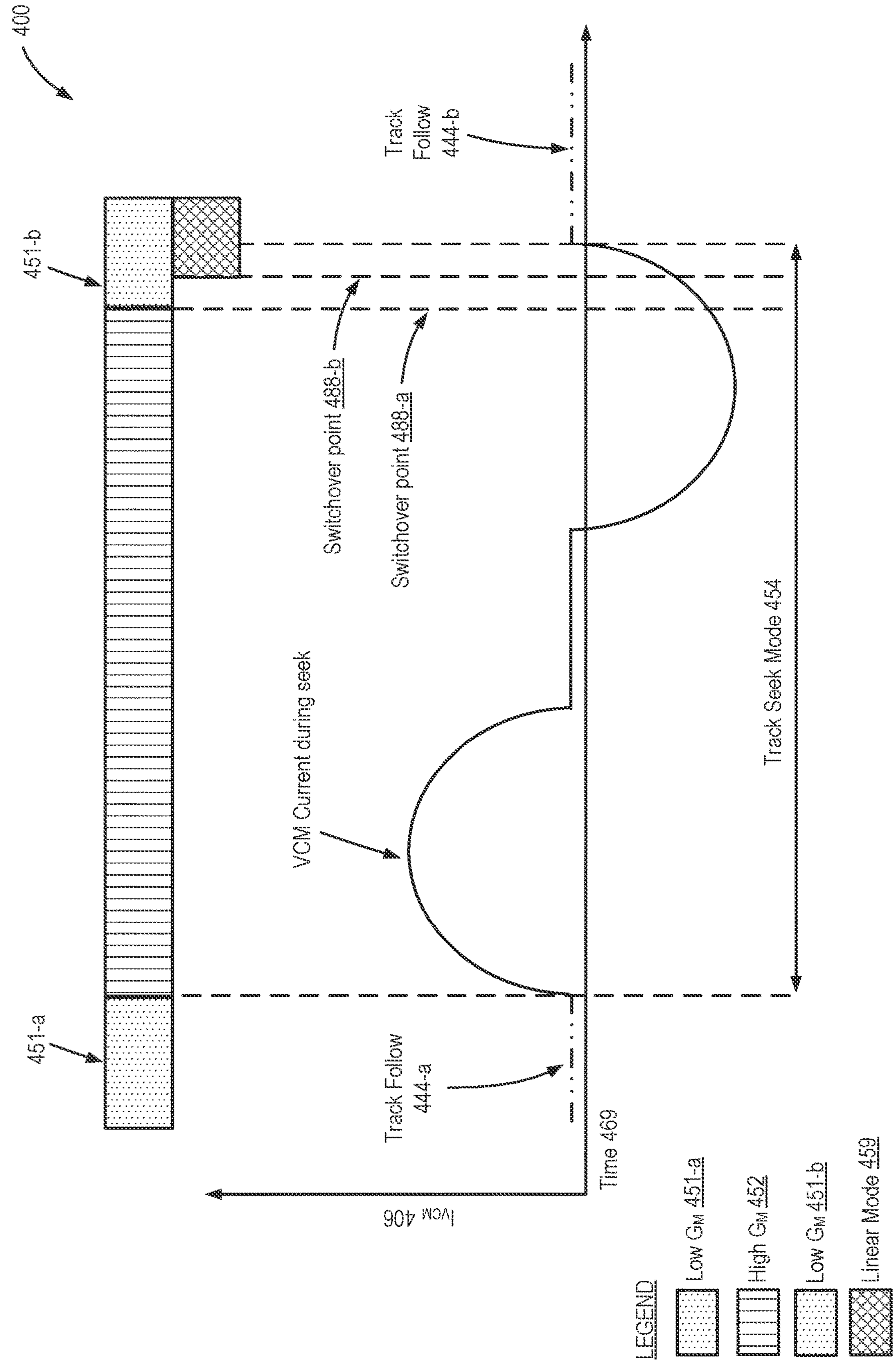
FIG. 4 illustrates a conceptual graph showing VCM current against time for a plurality of operating modes, according to various aspects of the present disclosure.
Figure 5:
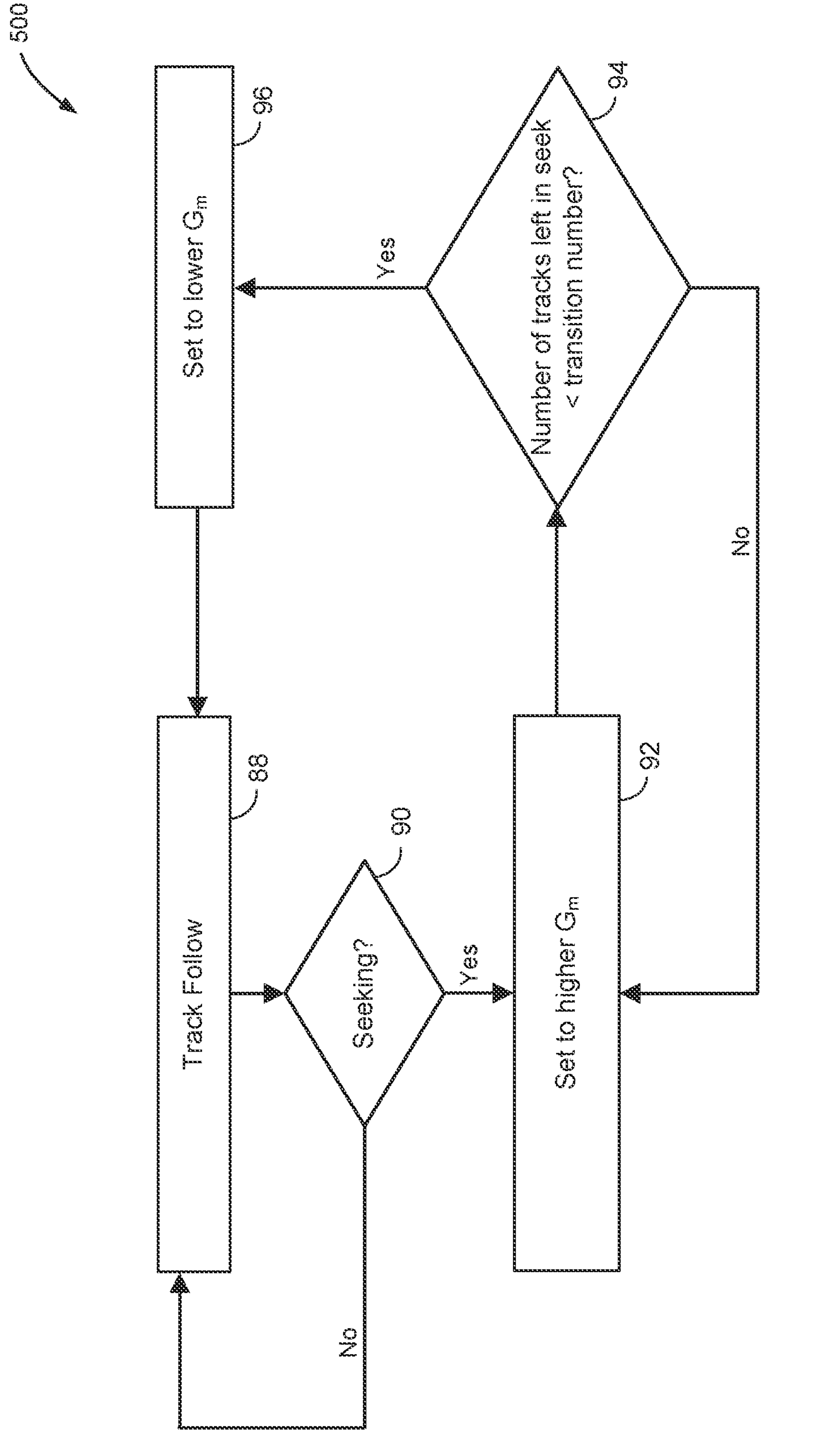
FIG. 5 depicts a method for enhancing current resolution for a VCM to decrease nRRO in a data storage device, in accordance with one or more aspects of the present disclosure.
Figure 6:
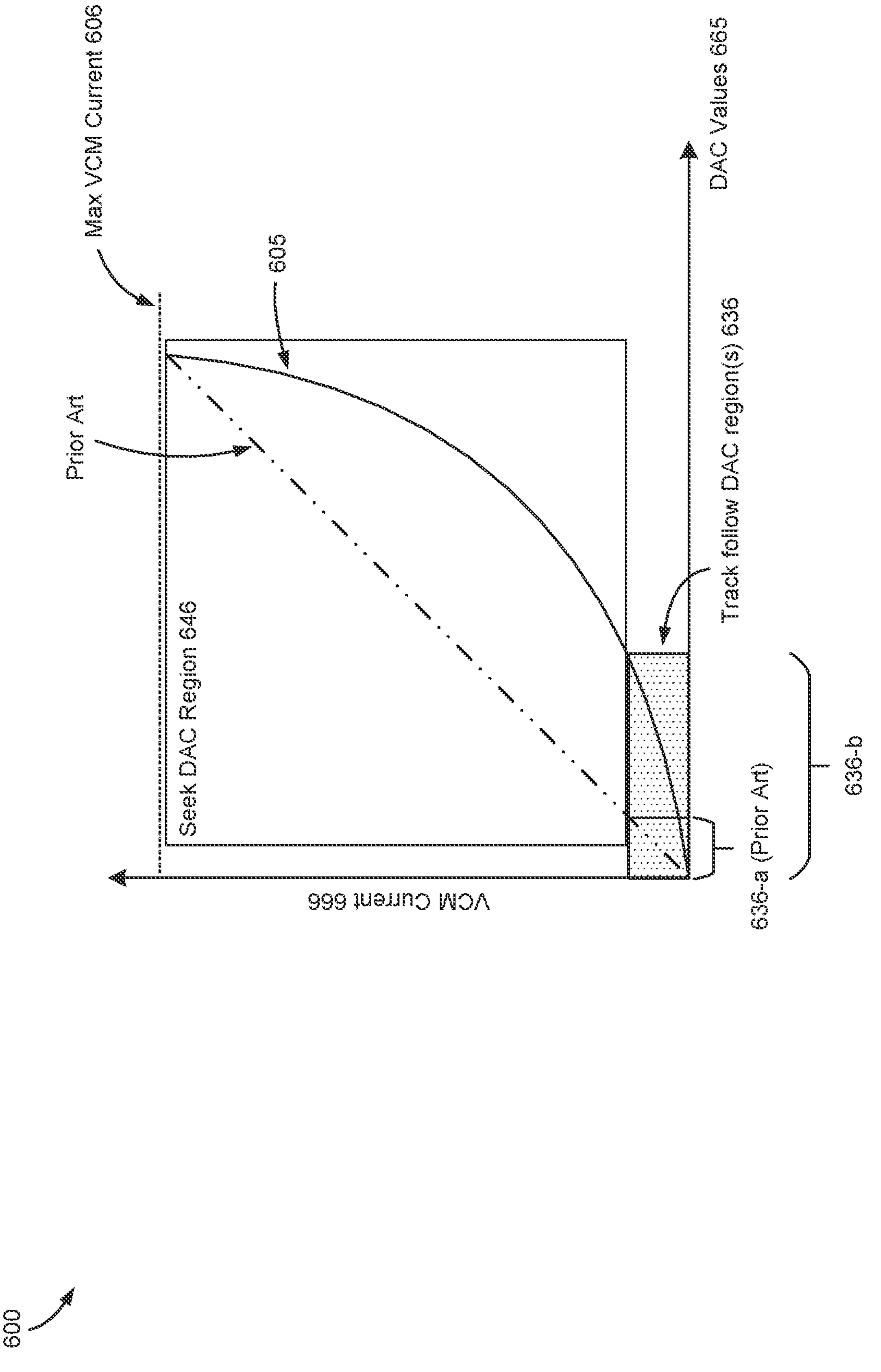
FIG. 6 shows a conceptual graph of VCM current against DAC code values for a track follow region and a track seek region, according to various aspects of the present disclosure.

In some cases, aspects of the present disclosure can be implemented using hardware (HW) modifications (e.g., providing a digital to analog converter (DAC) employing a non-linear function to define the relation between VCM current and digital code values, as discussed in relation to FIG. 6) or using firmware (FW) modifications (e.g., programmable transconductance $G_m$ and/or programmable resistances, as discussed in relation to FIGS. 3-5). In yet other cases, aspects of the present disclosure may be implemented through a combination of FW and HW modifications.

Turning now to FIGS. 2A and 2B, which illustrate conceptual block diagrams of a top view and a side view of a data storage device in the form of a disk drive 15, in accordance with aspects of the present disclosure. Disk drive 15 comprises control circuitry 22, an actuator assembly 19, and a plurality of hard disks 16A, 16B, 16C, 16D ("hard disks 16," "disks 16"). Host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing process.

Figure 2C:
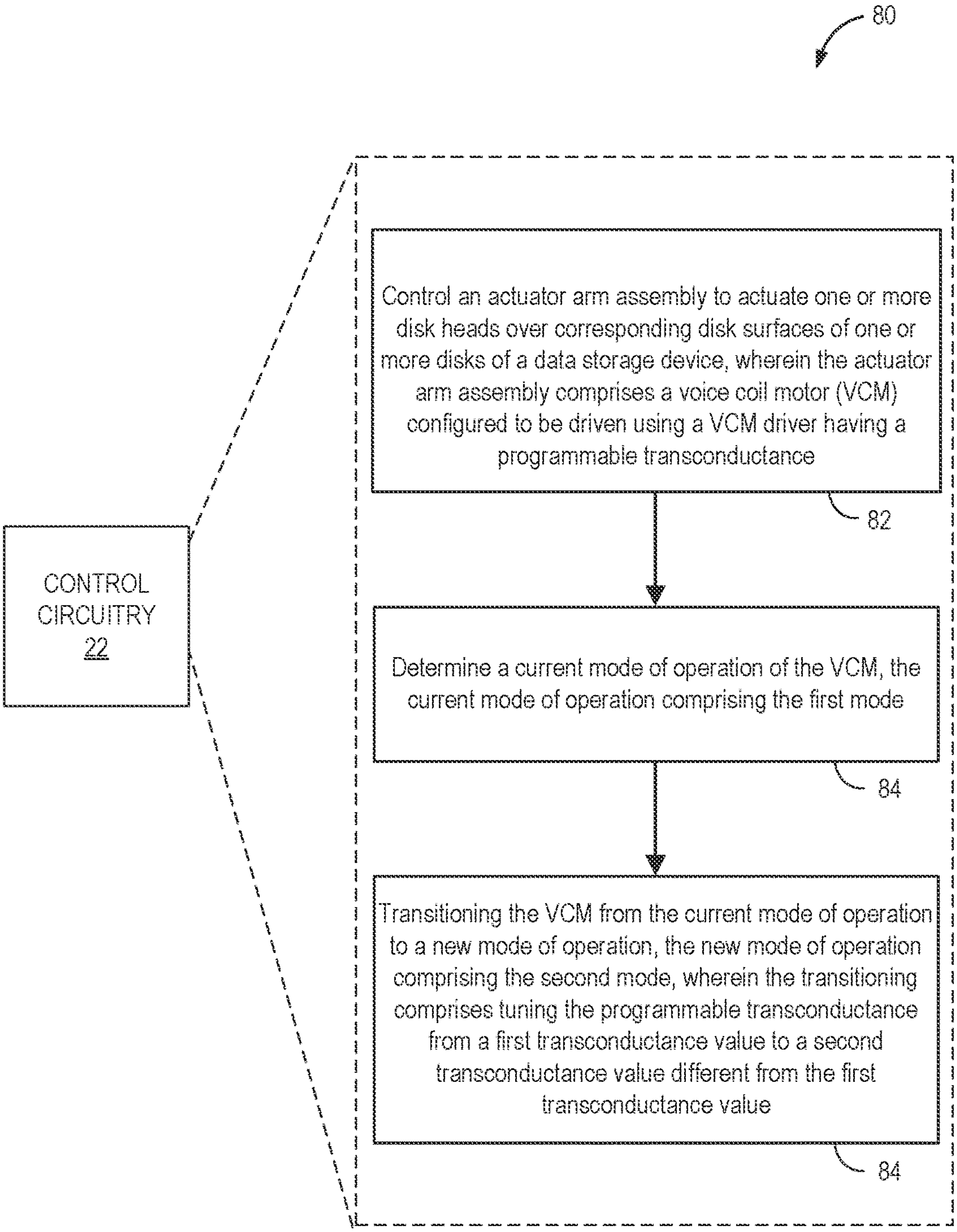
FIG. 2C illustrates an example of a method for enhancing current resolution for a voice coil motor (VCM) while following a track in a data storage device, according to various aspects of the disclosure.

FIG. 2C depicts a flowchart for an example method 80 that control circuitry 22 of disk drive 15 may perform or execute in controlling the operations of disk drive 15, in accordance with aspects of the present disclosure, as further described below.

Each disk (shown as disks 16A-D) can have thin film magnetic material on each of the planar surfaces. Each recording surface may comprise a dedicated pair of read and write heads packaged in a slider that is mechanically positioned over the rotating disk by an actuator (e.g., shown as actuator arm assembly 19 in FIG. 2B). In some examples, the actuator(s) also provide the electrical connections to the components of the slider. The actuator assembly 19 may also comprise one or more preamps (e.g., read or write preamp) for the heads, write driver, read driver, and fly-height controls.

Actuator assembly 19 thus comprises disk heads 18 (or simply, heads 18) and is configured to position the one or more heads 18 over disk surfaces 17 of the one or more disks 16. Heads 18 may each comprise write and read elements, configured for writing and reading control features and data to and from a corresponding disk surface 17 of hard disks 16. In some cases, the disk drive 15 according to various aspects of the disclosure comprises a system on a chip (SoC), where the SoC comprises the electronics and firmware for the disk drive 15. The SoC may be used to control the functions of the disk drive 15 including providing power and/or control signals to the components of the disk drive. In some cases, the SoC may include the control circuitry 22. Alternatively, one or more aspects of the control circuitry 22 may be implemented in or using the SoC.

Actuator arm assembly 19 (or simply, actuator assembly 19) comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a head 18 at a distal end 42 thereof (e.g., head 18A at a distal end 42A in topmost actuator arm 40A and head 18H at a distal end 42H in bottommost actuator arm 40H, in the view of FIG. 2B). Each of actuator arms 40 is configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Various examples may include any of a wide variety of other numbers of hard disks and disk surfaces, other numbers of actuator arm assemblies and primary actuators besides the one actuator assembly 19 and the one primary actuator 20 in the example of FIGS. 2A and 2B, and other numbers of fine actuators on each actuator arm, for example. Beyond the VCM as a primary actuator, other secondary or tertiary actuators such as micro-actuators and/or milli-actuators (e.g., made with piezo-electric (PZT) elements) may be located closer to the heads 18 for more refined and precise motion control of the heads.

Figure 1:
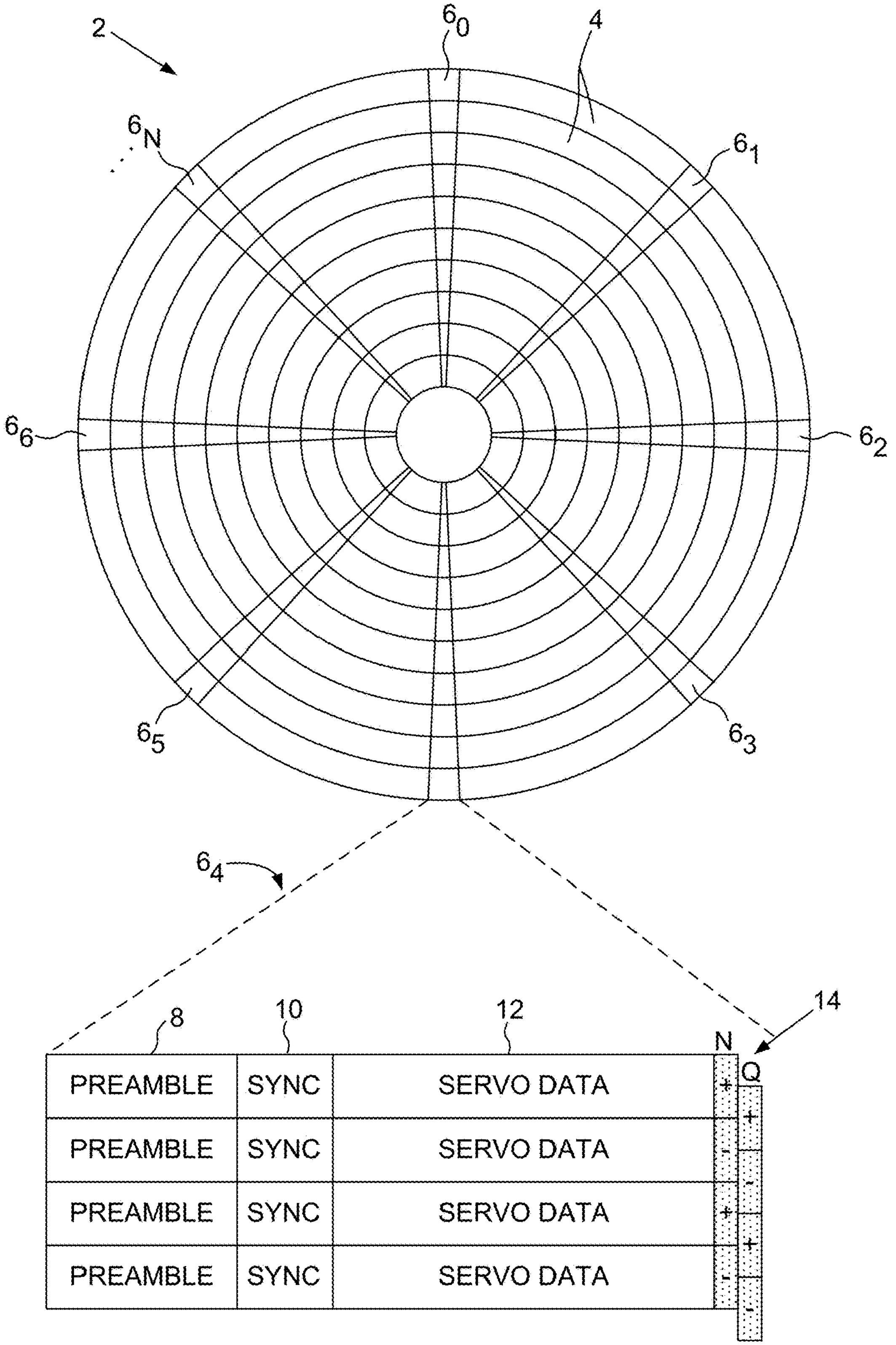
FIG. 1 shows a disk format as comprising a number of radially-spaced, concentric servo tracks defined by servo wedges recorded around the circumference of each servo track, according to various aspects of the present disclosure.

FIG. 2A also depicts servo sectors 32 (e.g., servo sectors 321 through 32N) written onto disk surfaces 17. In some examples, the servo sectors 32 (or servo wedges 32) on a disk drive may be curved, but for sake of illustration, the servo sectors 32 in FIG. 2A have been shown with straight lines. In some cases, when manufacturing a disk drive, servo sectors 32 may be written to disk surfaces 17 to define a plurality of evenly-spaced, concentric tracks 34. As an example, each servo sector 32, beyond the simplistic illustration of a servo wedge (sector) $\mathbf{6_4}$ in FIG. 1, may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align the moveable disk head 18 with and relative to, a particular track 34. Each circumferential track 34 includes a plurality of embedded servo sectors 32 utilized in seeking and track following. The plurality of servo sectors 32 are spaced sequentially around the circumference of a circumferential track 34 and extend radially outward from the inner diameter (ID) of disk surface 17. These embedded servo sectors 32 contain servo information utilized in seeking and track following and are interspersed between data regions on disk surfaces 17. Data is conventionally written in the data regions in a plurality of discrete data sectors. Each data region is typically preceded by a servo sector 32.

In the embodiment of FIG. 2A, the control circuitry 22 may also process a read signal 36 emanating from the head 18A to demodulate servo data written on the disk (e.g., servo sectors 32) to generate a position error signal (PES) representing an error between the actual position of the head and a target position relative to a target track. The control circuitry 22 may process the PES using a suitable servo control system to generate the control signal 38 (e.g., a VCM control signal) applied to the VCM 20 which rotates an actuator arm 40 about a pivot in order to actuate the head 18 radially over the disk surface 17 in a direction that reduces the PES.

As shown in FIG. 2A, the control circuitry 22 may include a VCM driver 24, where the VCM driver 24 further includes one or more of a linear driving circuit 37 and a PWM driving circuit 39. In some cases, the VCM driver 24 may be configured to drive the VCM 20 using a linear or current control loop (CCL) signal, i.e., by utilizing the linear driving circuit 37 to drive the VCM 20. In other cases, the VCM driver 24 drives the VCM 20 using a pulse width modulation (PWM) signal, i.e., by utilizing the PWM driving circuit 39 to drive the VCM 20. In some examples, the control circuitry 22 (or alternatively, the VCM driver 24) may select which one of the driving circuits (i.e., linear 37 or PWM 39) is utilized for driving the VCM 20 based at least in part on the PES. Generally, the PES is lower when the VCM 20 is driven using a linear or CCL signal, with the trade-off being higher power consumption. To optimize both PES and power consumption, the VCM 20 can be driven using the linear or CCL signal when the VCM is in a track follow mode, and a PWM signal when the VCM is in a track seek mode. For instance, the control circuitry 22 (or VCM driver 24) can control a switch (e.g., a field effect transistor (FET), such as a metal-oxide semiconductor FET or MOSFET) coupled between the VCM 20 and the linear and PWM driving circuits 37 and 39, respectively, to select the driving circuit (e.g., linear 37 or PWM 39) utilized to drive the VCM 20. As described in further detail below, in some cases, the control circuitry 22 can control the VCM driver to start driving the VCM 20 using a linear or CCL signal prior to the end of a seek operation (i.e., sometime before the start of a track follow operation). In other words, while operating in the track seek mode, the VCM can be driven using a PWM signal for a first duration and using a linear/CCL signal for a second duration, where the first duration is longer than the second duration, further described below in relation to at least FIG. 4.

As mentioned above, in some examples, the control circuitry 22 is configured to control the actuation of the primary actuator (i.e., VCM 20). Further, the VCM 20 is configured to actuate the head 18 over the disk surfaces 17.

In some embodiments, the VCM 20 is configured to operate in a plurality of modes, e.g., a track follow mode, a track seek mode, a linear mode, and/or a pulse width modulation (PWM) mode, to name a few. In some embodiments, a data storage device can comprise one or more disks and a VCM driver (e.g., VCM driver 24) having a programmable transconductance ($G_m$) and configured to drive a VCM (e.g., VCM 20) of the data storage device. Furthermore, as seen in method 80 in FIG. 2C, the control circuitry 22 is configured to control the actuator arm assembly to actuate one or more disk heads over corresponding disk surfaces of one or more disks (82) of the data storage device, wherein the actuator arm assembly further comprises the VCM. As noted above, the VCM may be configured to be driven using the VCM driver. In some embodiments, the one or more processing devices are further configured to determine a current mode of operation of the VCM, wherein the VCM is configured to operate in a first mode and a second mode, and wherein the current mode of operation comprises the first mode (84). The control circuitry 22 is further configured to transition the VCM from the current mode of operation to a new mode of operation, the new mode of operation comprising the second mode, wherein the transitioning comprises tuning the programmable transconductance $G_m$ from a first transconductance value to a second transconductance value different from the first transconductance value (86).

Figure 2D:
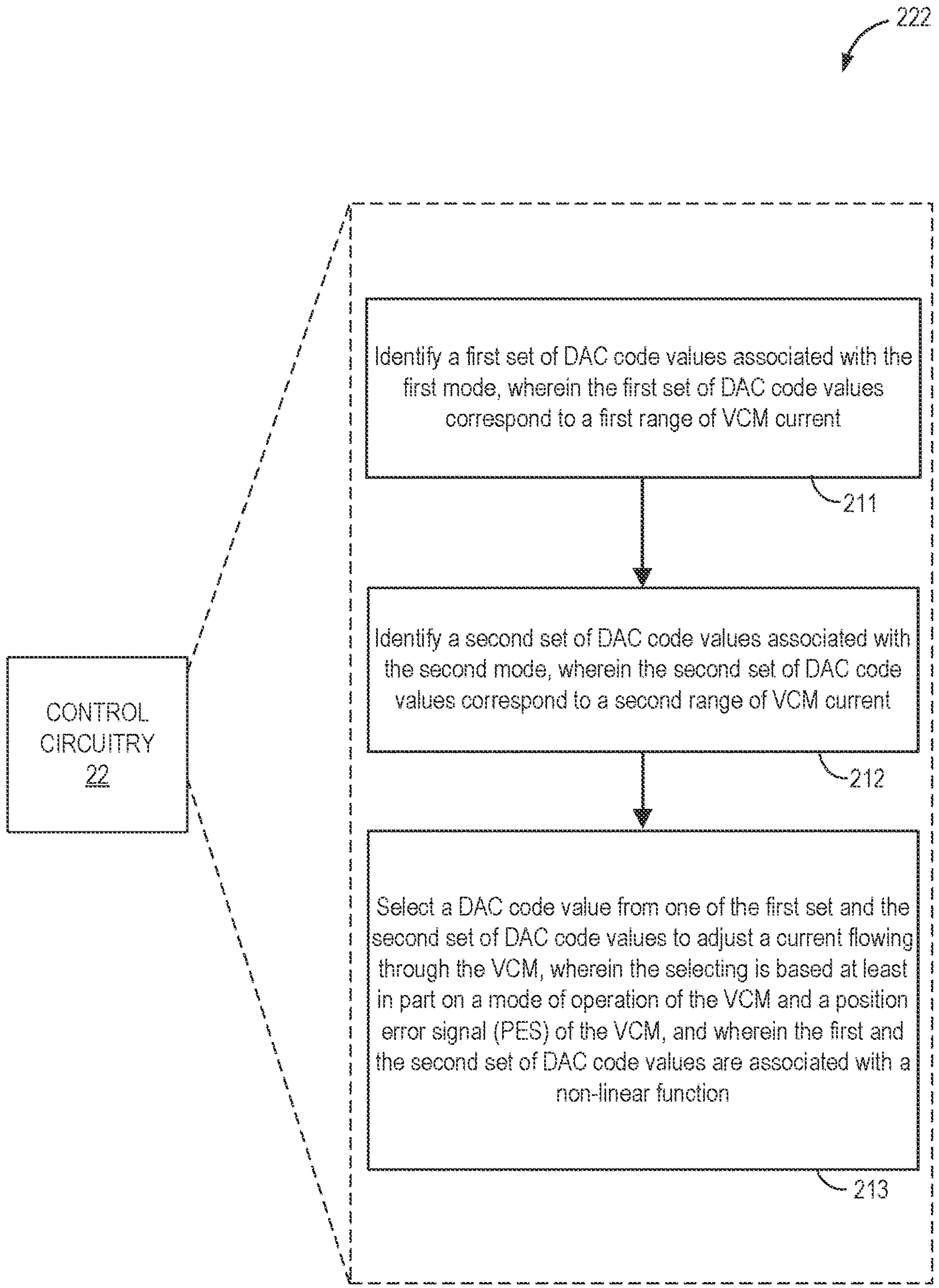
FIG. 2D illustrates an example of a method for using a non-linear VCM digital to analog converter (DAC) to enhance VCM current resolution in the track follow region and/or track seek region, in accordance with aspects of the disclosure.

FIG. 2D depicts another example of a method 222 that can be implemented using the VCM 20 and control circuitry 22, in accordance with various aspects of the disclosure. Method 222 is generally directed to the use of a non-linear VCM DAC for enhancing VCM current resolution.

In some cases, the control circuitry 22 is configured to identify a first set of DAC code values associated with the first mode, wherein the first set of DAC code values correspond to a first range of VCM current (211); identify a second set of DAC code values associated with the second mode, wherein the second set of DAC code values correspond to a second range of VCM current (212); and select a DAC code value from one of the first set and the second set of DAC code values to adjust a current flowing through the VCM, wherein the selecting is based at least in part on a mode of operation of the VCM and a position error signal (PES) of the VCM, and wherein the first and the second set of DAC code values are associated with a non-linear function (213).

In some embodiments, the VCM 20 is configured to operate in a plurality of modes, for instance, a first mode and a second mode. In some cases, each of the first and second modes comprises one of a pulse width modulation (PWM) mode and a linear or current control loop (CCL) mode. In some embodiments, the control circuitry 22 provides a PWM control signal to digital transistor switches providing an idle current to the VCM. In one non-limiting example, the PWM modulation circuit includes a plurality of digital transistor switches which provide current in a single direction through the VCM. A sense resistor 333 (shown as $R_s$ in FIG. 3) provides a sensed voltage proportional to the current (e.g., $I_{VCM}$ 306) through the VCM. This sensed voltage is amplified by an amplifier, herein referred to as a current sense amplifier (CSA), shown as CSA 340 in FIG. 3. In some examples, a comparator circuit provides a comparator output when said amplified voltage exceeds a predetermined value. A delay circuit may be used to activate the transistor switches and turn off a transistor switch in response to the comparator indicating a peak value has been reached. The delay circuitry may also simultaneously start a delay timer, which keeps the switch off for a predetermined time delay until the control current has decayed to the lowest desired value.

It should be noted that other techniques for generating a PWM drive voltage are contemplated in different embodiments, and the techniques described herein are exemplary only. For example, the control circuitry 22 or the VCM driver 24 may form a drive current command (e.g., VCM control signal 38 in FIG. 2A) for actuating the VCM based on the position error signal or PES. This drive current command may be converted into an analog signal (shown as $V_{DAC}$ in FIG. 3) by a digital/analog conversion circuit (DAC) 366. In some cases, an output side amplifier (e.g., in the control circuitry 22 or the VCM driver) forms a drive voltage for driving the VCM. Furthermore, a switch (e.g., Metal-oxide semiconductor field effect transistor or MOSFET) may be used to toggle/transition between the linear and PWM modes. For instance, the control circuitry 22 may control the opening/closing of one or more switches to select the driving circuit (e.g., linear driving circuit 37, PWM driving circuit 39) used to drive the VCM 20. In the linear mode, the drive voltage may be used to directly drive the VCM. Further, in the PWM mode, the drive voltage may be converted into a pulse signal (e.g., by a linear PWM modulation circuit) and input to the VCM. In some cases, the actual measured current ($I_{VCM}$ 306 in FIG. 3) may be converted into a voltage signal by a sense resistor ($R_s$) 333, where the voltage signal is amplified by the CSA (e.g., CSA 340 in FIG. 3) and used as a feedback signal (e.g., for the amplifier forming the drive voltage). Further, the CSA output voltage (i.e., corresponding to the actual measured current) is subtracted from the commanded DAC voltage (from DAC 366) to determine an error signal (e.g., error 311 in FIG. 3). In some examples, this error is amplified (e.g., with a certain desired bode response) by an error amplifier 341 and a power amplifier 342 is used to drive that error signal 311. As a result, the drive voltage causes a drive current proportional to the analog signal to flow through the VCM. In some examples, the switching between the linear mode and the PWM mode may be implemented using the same or similar techniques as those described in U.S. patent application Ser. No. 17/742,082, entitled "VCM PWM TO LINEAR MODE TRANSITION OFFSET OPTIMIZATION TO IMPROVE PES," filed May 11, 2022, and now issued as U.S. Pat. No. 11,763,843, which is assigned to the assignee hereof and incorporated herein by reference and for all proper purposes. Additionally, or alternatively, the switching between the linear mode and the PWM mode may be implemented using the same or similar techniques as those described in U.S. patent application Ser. No. 17/945,187, entitled "OPTIMIZE POWER, RTV, AND COUPLED PES DURING SEEK OPERATIONS," filed Sep. 15, 2022, which is assigned to the assignee hereof and incorporated herein by reference and for all proper purposes.

As noted above, the VCM driver 24 is primarily in PWM mode during a seek to a target track, which serves to enhance power efficiency. However, as the disk head approaches the target track, the control circuitry 22 is configured to switch the VCM driver to linear mode. While the linear mode utilizes more power than the PWM mode, the linear mode provides better accuracy and less current ripple, thus reducing the PES. Some aspects of the present disclosure are directed to enhancing accuracy (i.e., reducing PES, such as a track arrival PES) at the end of the seek operation, enhance current resolution during the track follow operation, and/or reduce nRRO, as compared to the prior art. In accordance with aspects of the present disclosure, different transconductance values (e.g., implemented using a programmable transconductance $G_m$ for the VCM driver or circuitry used to control the VCM) may be utilized for the track seek mode and the track follow mode to not only reduce RRO, nRRO, and increase VCM current resolution during the track follow mode, but to also optimize power consumption, as compared to the prior art. In one non-limiting example, during most of the duration in which the VCM is seeking towards the target track, a first transconductance value ($G_{m1}$) may be utilized to ensure a higher maximum VCM current can be achieved. Furthermore, towards the end of the seek operation, a second transconductance value ($G_{m2}$) may be utilized, where $G_{m2}<G_{m1}$, described in further detail below. In some embodiments, the control circuitry 22 is configured to transition the VCM to using the second transconductance value ($G_{m2}$) and/or switch the VCM to the linear mode of operation prior to the end of the seek operation (i.e., prior to entering the track follow mode).

Turning now to FIG. 3, which illustrates a block diagram 300 of a VCM 325 and its driver circuit 302, according to various aspects of the present disclosure. In some cases, the driver circuit 302 is also referred to as the VCM driver 302 and is similar or substantially similar to the VCM driver 24 described in relation to FIG. 2A. In some cases, VCMs work on the principle of a permanent magnetic field and a coil winding. When a current is applied to the VCM coil, a force is generated. This force, known as the Lorentz force, is directly proportional to the input current. By controlling the amount of current applied to the motor, accurate motor positioning may be achieved. In some examples, the current applied to the VCM may be controlled using a current control loop (CCL). In CCL, a sense resistor ($R_s$) 333 is placed in series to the VCM 325 and the voltage across that sense resistor is sensed. In FIG. 3, VCM 325 represents an example representation of the VCM circuitry, where current 306 corresponds to the current ($I_{VCM}$) flowing through the windings of the VCM. The driver circuit 302 may include analog output signals Aout and Bout, which can drive terminals of coils of the VCM 325 to control movement. As shown with respect to the VCM 325, the driver circuit 302 may include a motor inductance Lm, which may be the inductance of a coil of the VCM 325, which can help model the electrical behavior of the motor. As shown with respect to the VCM 325, the driver circuit 302 may include a motor resistance Rm, which may be the resistance of the coil of the VCM 325, which can help model power loss and current behavior. As shown with respect to the error amplifier 341, the driver circuit 302 may include a capacitance output or output capacitor Co in the driver circuit or a node connected to a capacitor used for filtering or stabilization. As shown with respect to the error amplifier 341, the driver circuit 302 may include a feedback capacitor Cf, which may be used in the feedback loop of the error amplifier 341 which can promote a stable and accurate control of the VCM 325. As shown with respect to the error amplifier 341, the driver circuit 302 may include an output resistance Ro, or the resistance at the output of a driver or amplifier stage. As shown with respect to power amplifiers 342, the driver circuit 302 may include a High Voltage Power HVPWR, or power supply input providing higher voltage for the VCM 325. As shown with respect to the VCM 325, the driver circuit 302 may include a Back Electromotive Force Voltage Vbemf, which may be voltage generated by the coil of the VCM 325 when it moves and can be used for position or velocity feedback. As seen, the VCM driver circuit 302 is connected to a digital to analog converter (DAC) 366 that outputs a DAC voltage ($V_{DAC}$). The VCM driver circuit 302 further comprises a current sense amplifier (CSA) 340 having a gain ($G_s$). The output of the CSA 340, while represented in a voltage form, may be associated or linked to the sensed current ($I_{SENSE}$ 316) and/or sensed voltage ($V_{SNS}$). Furthermore, the sensed current ($I_{SENSE}$ 316) may be determined based on the sensed voltage ($V_{SNS}$) and a resistance value of the sense resistor ($R_s$ 333). In some cases, the output voltage ($V_{SNS}$) of the CSA 340 may be compared to (e.g., subtracted from) the $V_{DAC}$ to determine an error 311, where the error 311 is input into the error amplifier 341. The VCM driver circuit 302 may further comprise a power amplifier 342 that amplifies the "small signal" error 311 to a "large signal", which is then used to drive the coils of the VCM 306. In this example, $V_{DAC}/R_1=V_{SNS}/R_2$, where $V_{SNS}=G_s\times R_s\times I_{SENSE}$, and $G_s$=gain of CSA 340. Thus, the sensed current ($I_{SENSE}$) 316 can be calculated as: $I_{SENSE}=V_{DAC}\times(R_2/(G_s\times R_s\times R_1))$. Furthermore, the transconductance ($G_m$) of the VCM driver circuit 302 (also shown as VCM driver circuit 24 in FIG. 2A) can be calculated as a function of the resistances ($R_2$ and $R_1$) and the gain ($G_s$). For instance, the transconductance $G_m$ can be calculated as: $G_m=R_2/(R_1*G_s*R_s)$. Furthermore, the VCM current ($I_{VCM}$ 306) can be represented as a function of the transconductance ($G_m$) and $V_{DAC}$ as follows: $I_{VCM}=V_{DAC}*G_m$. In some instances, the sensed current ($I_{SENSE}$ 316) may be equal or approximately equal to the VCM current ($I_{VCM}$ 306). In such cases, $I_{SENSE}=I_{VCM}=V_{DAC}*G_m$. Alternatively, the sensed current ($I_{SENSE}$ 316) may be proportional (e.g., by a scaling factor, where the scaling factor is greater than or less than 1) to the VCM current ($I_{VCM}$ 306). In some cases, if $I_{SENSE}$ 316=$I_{VCM}$ 306, the scaling factor is roughly equal to 1.

Thus, the transconductance value can be adjusted or tuned by varying one or more parameters, including at least a first resistance (e.g., tunable resistance $R_1$), a second resistance (e.g., tunable resistance $R_2$), and/or a gain of a CSA (e.g., CSA 340) in the VCM driver circuit 302. Specifically, but without limitation, the transconductance value $G_m$ of the transconductance loop of the VCM controller and/or driver circuit 302 may be tuned by varying one or more of a first tunable resistance $R_1$ (i.e., a tunable resistance associated with or tied to an output of the DAC 366), a second tunable resistance $R_2$ (i.e., a tunable resistance associated with or tied to an output of the CSA 340), and a gain ($G_s$) of the CSA 340.

In accordance with aspects of the present disclosure, the VCM current ($I_{VCM}$ 306) may be optimized during the track follow mode by using a programmable/variable transconductance ($G_m$) for the VCM control loop (or VCM driver 302). Specifically, but without limitation, the control circuitry 22 may be configured to vary the value of the transconductance, based at least in part on the mode of operation and/or the PES. Some non-limiting examples of modes may include a track seek mode, a track follow mode, a linear or CCL mode, and a PWM mode. In some embodiments, the control circuitry 22 and/or firmware (FW) may be configured to modify the transconductance ($G_m$) by changing resistance values of one or more of the tunable resistances $R_1$ and $R_2$. In some examples, the ratio of $R_1$ to $R_2$ (i.e., $R_1/R_2$, or conversely, $R_2/R_1$) can be varied to allow a larger $G_m$ to be used during the seek mode. This in turn allows a higher maximum VCM current ($I_{VCM}$ 306), which can facilitate in optimizing the seek operation (e.g., lower power consumption). Furthermore, a lower $G_m$ value can be used during the track follow mode, which may facilitate in optimizing the track follow operation (e.g., lower PES). In some instances, the use of a lower $G_m$ value during the track follow mode may allow a higher current resolution (i.e., as compared to the higher $G_m$ value) to be used during the track seek mode. In some embodiments, one or more of resistances $R_1$ and $R_2$ may be tunable. Additionally, or alternatively, in some embodiments, the gain ($G_s$) of the CSA 340 may be tuned to control the value of the transconductance $G_m$.

FIG. 4 depicts a conceptual graph 400 showing VCM current ($I_{VCM}$ 406) against time 469 for a plurality of VCM operating modes, according to various aspects of the present disclosure. In this example, $I_{VCM}$ 406 is shown along the vertical or y-axis, while time 469 is shown along the horizontal or x-axis. In some embodiments, the control circuitry 22 (or alternatively, FW) may be configured to select a transconductance ($G_m$) value for the VCM control loop from a plurality of transconductance values, based on the mode of operation (e.g., track follow mode, track seek mode) of the VCM. In some instances, a higher $G_m$ may be utilized during the track seek mode, which enables a higher VCM current. This can help reduce seek time, reduce power consumption, etc., as compared to the prior art. Furthermore, a lower $G_m$ may be utilized during the track follow mode to enhance current resolution (i.e., compared to the higher $G_m$ mode), as well as the prior art.

As shown in FIG. 4, the control circuitry 22 may control the VCM to follow a first target track (not shown) in a track follow mode 444-*a*, in which case a first transconductance value $G_M$ 451-*a* (or low $G_M$ 451-*a*) may be employed for the VCM control loop. The control circuitry 22 may then transition the VCM to seek towards a second target track in a track seek mode, in which case a second transconductance value $G_M$ 452 (or high $G_M$ 452) may be employed for the VCM control loop. In some cases, the second transconductance value $G_M$ 452 may be higher than the first transconductance value $G_M$ 451-*a*. FIG. 4 shows a plot of the VCM current while the VCM is operating the track seek mode 454. Once the VCM is about to arrive at the second target track, e.g., detected based on PES, the control circuitry 22 tunes the programmable/variable transconductance of the VCM driver (e.g., VCM driver 302 in FIG. 3) from the second transconductance value $G_M$ to a third transconductance value $G_M$ 451-*b* (or low $G_M$ 451-*b*), where the third transconductance value is lower than the second transconductance value $G_M$ 452. In some cases, the first and the third transconductance values $G_M$ 451-*a* and $G_M$ 451-*b* may be equal or substantially equal to each other.

As shown in FIG. 4, the control circuitry of the disk drive then controls the VCM driver to apply the third transconductance value $G_M$ 451-*b* for the VCM control loop and finish seeking the VCM towards the second target track. In some embodiments, towards the end of the seek operation, the control circuitry 22 may cause the VCM driver (e.g., VCM driver 302) to switch to the lower $G_M$ mode, for instance, when a number of tracks (i.e., transition number) remaining before the linear/CCL mode 459 is at or below a threshold. Such a design can facilitate in increased accuracy (e.g., lower PES) when the VCM enters the linear mode 459. As previously noted, the VCM generally operates in the linear/CCL mode during track follow operations and in the PWM mode during track seek operations. In some cases, towards the end of the track seek mode 454, one or more switchover points (e.g., switchover point 488-*a*, switchover point 488-*b*) may be crossed before the VCM enters the linear mode 459. For example, a first switch over point 488-*a* may correspond to a first transition number of tracks remaining before the VCM enters the linear mode 459, and where the transconductance ($G_m$) of the VCM control loop is tuned from the high $G_M$ 452 to the low $G_M$ 451-*b*. In some embodiments, a second switch over point 488-*b* may correspond to a second transition number of tracks remaining before the VCM enters the linear mode 459, where the second transition number is lower than the first transition number. Additionally, or alternatively, the second switchover point 488-*b* occurs later in time than the first switchover point 488-*b*. At the second switchover point 488-*b*, the VCM enters the linear/CCL mode 459 and remains in this state for the remainder of track follow operation 444-*b* and/or until a subsequent track seek operation is initiated by the control circuitry 22. In some aspects, the use of one or more switchover points at which the VCM driver (or VCM control loop) transitions from a higher $G_m$ to a lower $G_M$, the VCM transitions from a PWM mode to a linear/CCL mode, etc., facilitates in increased accuracy, reduces track arrival PES, optimizes power consumption, and/or helps settle any potential offset(s) introduced due to the different $G_M$ modes.

FIG. 5 illustrates a flowchart of a method 500 for operating a data storage device, according to various aspects of the disclosure. The operations 88-96 of method 500 may be implemented using FW, control circuitry 22, and/or a SoC.

As seen, at operation 88, the VCM (e.g., VCM 20) of the data storage device (e.g., data storage device discussed in relation to FIGS. 2A and/or 2B) may operate in a track follow mode, in which case the VCM current is controlled to reduce or minimize the PES while following a first target track. In some cases, the transconductance ($G_m$) of the VCM control loop may be set to a first transconductance value while the VCM is in the track follow mode.

Next, at decision block 90, the method 500 comprises determining whether the VCM should switch to a seek operation/mode, for instance, to seek towards a second, different target track. If no, the method 500 returns to operation 88 to continue operating the VCM in the track follow mode. If yes, the method proceeds to operation 92, where operation 92 comprises tuning the transconductance of the VCM driver (or alternatively, the VCM control loop) to a second, higher transconductance value.

In some embodiments, the control circuitry 22 (or another component of the disk drive) is configured to monitor the PES and/or location of the VCM as it seeks over the disk surface and towards the second target track and determine whether one or more pre-defined switchover points (e.g., switchover points 488-*a*, 488-*b* in FIG. 4) have been crossed. For example, at decision block 94, the method 500 comprises determining whether a number of tracks left in the seek operation is less than a threshold (or transition number) of tracks. If no, the method 500 comprises continuing the seek operation until the number of tracks left in the seek operation is less than the transition number. If yes, the method 500 proceeds to operation 96, where operation 96 comprises tuning the $G_m$ of the VCM control loop and/or driver to a lower value (i.e., as compared to the $G_m$ value used during the seek operation in operation 92). The method 500 then comprises completing the transition of the VCM from the track seek mode to the track follow mode to enable the VCM to follow the new/second target track.

As described above in relation to FIG. 4, in some cases, after setting the $G_m$ value to the lower value, the VCM may enter a linear/CCL mode before it begins following the new or second target track. In other words, towards the end of the seek operation and prior to entering the track follow mode, the transconductance may be tuned from a higher $G_m$ value to a lower $G_m$ value. Optionally, the control circuitry 22 may also transition the VCM from the PWM mode to the linear mode prior to entering the track follow mode. In such cases, at the end of the seek operation, the time period of lower $G_m$

451-*b* value may overlap with (1) the VCM operating in the PWM mode and/or track seek mode 454 (i.e., between switchover point 488-*a* and 488-*b*), and (2) the VCM simultaneously operating in the track seek mode 454 and the linear/CCL mode 459 (after switchover point 488-*b* to the end of the right most vertical dotted line indicating the end of the track seek mode 454), as shown and described in relation to FIG. 4.

As noted above, some aspects of the present disclosure can also be implemented using a hardware modification (e.g., non-linear VCM DAC), which can help increase VCM current resolution in the track follow and/or track seek regions, as compared to the prior art. This in turn can help reduce nRRO, further described below in relation to FIG. 6.

FIG. 6 illustrates an example of a conceptual graph 600 of VCM current 666 against DAC code values 665, in accordance with aspects of the present disclosure. In some cases, the VCM driver (e.g., VCM driver 24) of a data storage device, such as the disk drive 15, comprises a transconductance ($G_m$) loop which sets the VCM current ($I_{VCM}$) based on the digital to analog converter (DAC) code and/or PES. This may be done by measuring the VCM current (e.g., VCM current 666), where the VCM current may be measured directly or indirectly (e.g., measuring a voltage drop across a sense resistor, such as $R_s$ 333 in FIG. 3). In some cases, the voltage across the VCM may be controlled to achieve the desired VCM current (e.g., $I_{VCM}$ 306 in FIG. 3). Typically, during seeking, the current resolution is coarse (i.e., as compared to the track follow mode). Furthermore, increasing current resolution during the track follow mode can facilitate in reducing non-repeatable runout or nRRO, which helps optimize disk drive performance.

In accordance with aspects of the present disclosure, a non-linear DAC (e.g., employing a non-linear function to define a relation between digital code values 665 and corresponding VCM current values 666) can be employed to enhance the VCM current resolution during at least the track follow mode (and optionally the track seek mode). In some cases, the non-linear DAC may be logarithmic, a polynomial, or another applicable non-linear function that allows the control circuitry 22 of the disk drive to track a DAC value 665 to a corresponding VCM current 666 output.

The graph 600 depicts an example of a relationship (i.e., linear or substantially linear) between the VCM current 666 and DAC code values 665 in the prior art. Furthermore, graph 600 also depicts the range of VCM current 666 values and the range of DAC code values 665 corresponding to each of the track seek DAC region 646 and the track follow DAC region 636. As seen, the VCM current resolution in the prior art is low due to the narrow range of DAC code values 665 falling within the track follow DAC region 636-*a*. In contrast, the use of a non-linear DAC (trace 605) enables a larger DAC range for the track follow region 636-*b*, which helps enhance current resolution and/or reduce nRRO, as compared to the prior art. Specifically, the non-linear relationship between the VCM current 666 and the DAC code values 665 enables a larger range of DAC code values 665 to be supported for the same range of VCM current 666, which allows a higher level of granularity/resolution for the VCM current, as compared to the prior art. Furthermore, such a design still enables maximum VCM current 606 to be achieved using the same or substantially the same range of DAC code values as in the prior art. In some instances, the use of a non-linear VCM DAC may facilitate in increasing VCM current resolution (e.g., by a factor of 2, 5, etc.), as compared to the prior art.

Thus, the techniques described herein may help optimize one or more of nRRO, RRO, PES, power consumption, and/or VCM current resolution, which in turn can help improve disk drive performance, as compared to the prior art.

Any suitable control circuitry (e.g., control circuitry 22 in FIG. 2A) may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or system on a chip (SoC). In addition, the control circuitry 22 may include a preamp circuit, where the preamp circuit is implemented as a separate integrated circuit, integrated into the read channel or data storage controller circuit, or integrated into the SoC.

In some examples, the control circuitry, such as, but not limited to, control circuitry 22, comprises a microprocessor executing instructions, the instructions being operable to cause the microprocessor to perform the flow diagrams (e.g., shown in FIGS. 2C-D and/or 5) described herein. The instructions may be stored in any computer-readable medium. In some examples, they may be stored on a non-volatile semiconductor memory device, component, or system external to the microprocessor, or integrated with the microprocessor in the SoC. In some examples, the instructions are stored on the disk and read into a volatile semiconductor memory when the disk drive is powered on. In some examples, the control circuitry 22 comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry 22 as described herein, and/or may perform one or more of the functions of control circuitry as described herein. In various examples, the control circuitry 22, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive, such as disk drive 15, may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and subcombinations are intended to fall within the scope of this disclosure. In addition, certain method(s), event(s), or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the disclosure. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 may be performed by or embodied in hardware, and/or performed or executed by a controller, a CPU, a field-programmable gate array (FPGA), a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for power improvement for minimum switching frequency operation for data storage devices, and other aspects of this disclosure. Persons skilled in the relevant fields of art will be well-equipped by this disclosure with an understanding and an informed reduction to practice of a wide panoply of further applications, architectures, techniques, and methods for power improvement for minimum switching frequency operation for data storage devices, and other aspects encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:

one or more disks;

a voice coil motor (VCM) driver having a programmable transconductance ($G_m$) and configured to drive a VCM;

an actuator arm assembly comprising:

one or more disk heads; and the VCM, wherein the VCM is configured to operate in at least a first mode and a second mode; and one or more processing devices configured, individually or in combination, to control the actuator arm assembly to actuate the one or more disk heads over corresponding disk surfaces of the one or more disks, the one or more processing devices being further configured, individually or in combination, to:

determine a current mode of operation of the VCM, the current mode of operation comprising the first mode; and transition the VCM from the current mode of operation to a new mode of operation, the new mode of operation comprising the second mode, wherein the transitioning comprises:

tuning the $G_m$ from a first transconductance value to a second transconductance value different from the first transconductance value by varying one or more of a first resistance, a second resistance, or a gain $G_S$ of a current sense amplifier (CSA) in the VCM driver.

2. The data storage device of claim 1, wherein:

the first mode comprises a track follow mode;

the second mode comprises a track seek mode; and the second transconductance value associated with the track seek mode is higher than the first transconductance value associated with the track follow mode.

3. The data storage device of claim 2, wherein the one or more processing devices are further configured, individually or in combination, to perform the tuning of the $G_m$ by:

controlling the VCM to follow a first target track in the first mode, based at least in part on using the first transconductance value for the VCM driver;

identifying a second target track; and seeking the VCM towards the second track in the second mode, based at least in part on using the second transconductance value for the VCM driver.

4. The data storage device of claim 3, wherein the one or more processing devices are further configured, individually or in combination, to:

tune the $G_m$ from the second transconductance value to a third transconductance value, based at least in part on detecting that a position error signal (PES) is below a threshold; and control the VCM to follow the second target track in a third mode, based at least in part on using the third transconductance value for the VCM driver.

5. The data storage device of claim 4, wherein the third mode comprises the track follow mode.

6. The data storage device of claim 4, wherein one of:

the third transconductance value is equal or substantially equal to the first transconductance value; or the third transconductance value is different from the first and second transconductance values.

7. The data storage device of claim 1, wherein:

the VCM driver comprises a plurality of tunable resistances, including at least a first tunable resistance and a second tunable resistance, wherein the first resistance is the first tunable resistance and the second resistance is the second tunable resistance; and tuning the $G_m$ comprises adjusting a respective resistance value of at least one of the first and the second tunable resistances.

8. The data storage device of claim 7, wherein:

the first mode comprises a track follow mode;

the second mode comprises a track seek mode; and one or more of:

a ratio of a respective resistance value of the first tunable resistance to the second tunable resistance is higher in the track seek mode as compared to the track follow mode, a maximum VCM current is higher in the track seek mode as compared to the track follow mode, and a current resolution is higher in the track follow mode as compared to the track seek mode.

9. The data storage device of claim 7, wherein:

the first tunable resistance is associated with an output of a digital-to-analog converter (DAC) coupled to the VCM driver; and the second tunable resistance is associated with an output of a current sense amplifier (CSA) of the VCM driver.

10. The data storage device of claim 1, wherein the VCM driver comprises:

a plurality of tunable resistances, including at least a first tunable resistance and a second tunable resistance wherein the first resistance is the first tunable resistance and the second resistance is the second tunable resistance; and wherein tuning the $G_m$ comprises adjusting at least one of (1) a respective resistance value of one or more of the first and the second tunable resistances, and (2) the gain $G_s$ of the CSA.

11. The data storage device of claim 1, wherein the VCM driver is configured to drive the VCM:

using a linear or current control loop (CCL) signal when operating in the first mode, the first mode comprising a track follow mode; and using a pulse width modulation (PWM) signal when operating in the second mode, the second mode comprising a track seek mode.

12. The data storage device of claim 1, wherein the transitioning further comprises:

identifying a first switch over point and a second switch over point, the first switch over point corresponding to a first number of tracks remaining before arrival at a target track and the second switch over point corresponding to a second number of tracks remaining before arrival at the target track, the second number lower than the first number;

tuning, at the first switch over point, the $G_m$ from the second transconductance value to the first transconductance value, wherein the second transconductance value is higher than the first transconductance value; and at the second switch over point, controlling the VCM to seek towards the target track by driving the VCM using a linear or current control loop (CCL) signal, and wherein the second switch over point occurs before the VCM transitions into the first mode, the first mode comprising a track follow mode.

13. A method of operating a data storage device, comprising:

determining a current mode of operation of a voice coil motor (VCM) of the data storage device, wherein the VCM is configured to operate in a first mode and a second mode, the current mode of operation comprising the first mode, and wherein the VCM is configured to be driven using a VCM driver having a programmable transconductance ($G_m$); and transitioning the VCM from the current mode of operation to a new mode of operation, the new mode of operation comprising the second mode, wherein the transitioning comprises:

tuning the $G_m$ from a first transconductance value to a second transconductance value different from the first transconductance value by varying one or more of a first resistance, a second resistance, or a gain $G_S$ of a current sense amplifier (CSA) in the VCM driver.

14. One or more processing devices, comprising, individually or in combination:

means for determining a current mode of operation of a voice coil motor (VCM) of a data storage device, wherein the VCM is configured to operate in a first mode and a second mode, the current mode of operation comprising the first mode, and wherein the VCM is configured to be driven using a VCM driver having a programmable transconductance ($G_m$); and means for transitioning the VCM from the current mode of operation to a new mode of operation, the new mode of operation comprising the second mode, wherein the means for transitioning comprises:

means for tuning the Gm from a first transconductance value to a second transconductance value different from the first transconductance value by varying one or more of a first resistance, a second resistance, or a gain GS of a current sense amplifier (CSA) in the VCM driver.

* * * * *